United States Patent
Ikeda et al.

(10) Patent No.: US 8,358,375 B2
(45) Date of Patent: Jan. 22, 2013

(54) METHOD AND DEVICE FOR ACCURATELY AND EASILY MEASURING A TIME DIFFERENCE BETWEEN VIDEO AND AUDIO

(75) Inventors: Hiroaki Ikeda, Chiba (JP); Reiko Iwai, Chiba (JP)

(73) Assignee: National University Corporation Chiba University (JP)

( * ) Notice: Subject to any disclaimer, the term of this patent is extended or adjusted under 35 U.S.C. 154(b) by 590 days.

(21) Appl. No.: 12/091,437

(22) PCT Filed: Oct. 6, 2006

(86) PCT No.: PCT/JP2006/320098
§ 371 (c)(1),
(2), (4) Date: Nov. 18, 2009

(87) PCT Pub. No.: WO2007/049451
PCT Pub. Date: May 3, 2007

(65) Prior Publication Data
US 2010/0053340 A1     Mar. 4, 2010

(30) Foreign Application Priority Data

Oct. 27, 2005   (JP) ................................ 2005-312111

(51) Int. Cl.
*H04N 9/475*   (2006.01)
(52) U.S. Cl. ........................................ 348/515; 348/512
(58) Field of Classification Search .......... 348/512–519, 348/473–479, 192, 180, 571–578
See application file for complete search history.

(56) References Cited

U.S. PATENT DOCUMENTS

| | | | | |
|---|---|---|---|---|
| 6,836,295 B1 * | 12/2004 | Cooper | ......................... | 348/515 |
| 7,499,104 B2 * | 3/2009 | Cooper | ......................... | 348/512 |
| 7,907,211 B2 * | 3/2011 | Oostveen et al. | ............. | 348/515 |
| 7,948,558 B2 * | 5/2011 | Stanger et al. | ................. | 348/515 |
| 2006/0078305 A1 * | 4/2006 | Arora et al. | ...................... | 386/96 |

FOREIGN PATENT DOCUMENTS

| | | |
|---|---|---|
| JP | 07-038771 | 2/1995 |
| JP | 07-177479 | 7/1995 |
| JP | 09-083469 | 3/1997 |
| JP | 09-130789 | 5/1997 |
| JP | 10-145645 | 5/1998 |
| JP | 2000-196917 | 7/2000 |
| JP | 2002-165153 | 6/2002 |
| JP | 2003-046901 | 2/2003 |
| JP | 2003-158643 | 5/2003 |
| JP | 2005-033314 | 2/2005 |
| WO | WO 2006/100727 A1 | 9/2006 |

* cited by examiner

*Primary Examiner* — Michael Lee
(74) *Attorney, Agent, or Firm* — Knobbe, Martens, Olson & Bear, LLP

(57) ABSTRACT

To solve the problems in the prior art, the present invention provides a method for measuring a time difference between digital video signals and digital audio signals, wherein said method comprises the steps of extracting respective time series data from respective frequency domains of said digital video signals and said digital audio signals; statistically identifying the cross-correlation of said time series data in said frequency domains, thereby measuring the time difference between said digital video signals and said digital audio signals.

8 Claims, 8 Drawing Sheets

METHOD AND DEVICE FOR ACCURATELY AND EASILY MEASURING A TIME DIFFERENCE BETWEEN VIDEO AND AUDIO

TECHNICAL FIELD

The present invention relates to a method for accurately and easily measuring a time difference between digital video signals and digital audio signals accompanied the digital video signals by signal processing within a time window frequency domain, and a device therefor.

BACKGROUND OF ART

In recent year, a digital format in which a video data or an audio data is converted into digital signals for the transmission thereof has been attracted attention and has developed to practical use thereof. As compared to the analog format in the prior art, in the digital format, by such a data processing, the edition of programs or a post-production can easily be performed and data compression is allowed as desired, resulting in the production of various qualities of programs. For the recording medium, a personal computer internally arranged hard disk device or a digital versatile disk (DVD) is replaced with a video tape of analog format. Moreover, the transmission is of being through the Internet as a transmission medium and, as compared with the analog format, therefore, any desired information is easily available in all areas all over the country without "ghost image" that is undesirable double-image of a television picture, as well as, broadcast audience participation programs have been tried.

However, since, in the device for reproducing the television information stored in a recording medium, the digital video signals and the digital audio signals are separately processed, the difference between the reproduced video and the reproduced audio accompanied therewith will become a problem. While, since packet transmission in the Internet protocol is transferred through a large number of routers or network operating centers, there is an uncertainty to be added to the digital television information in the recording medium. Therefore, International Telecommunication Union (ITU) or International Electrotechnical Commission (IEC) recognizes the need for a method for more accurately measuring the time difference corresponding to the digital televisions. On the other hand, in the conventional signal processing for analog formats such as a high-definition, NTSC, and PAL formats, for example, the following methods have been proposed to detect and correct the difference between video and audio signals.

(1) Prior Art 1 (Patent Document 1: Japanese Patent Application Laid-Open Publication No. H07-38,771)

In order to adjust the difference between a dynamic image and the audio accompanied therewith, the technique in which a special signal format provided by inserting reference signals into respective dynamic image and the audio is objected has been disclosed.

(2) Prior Art 2 (Patent Document 2: Japanese Patent Application Laid-Open Publication No. 2000-196,917)

In order to adjust the difference between a dynamic image and the audio accompanied therewith, the technique in which an analog format such as analog formats such as a high-definition, NTSC, and PAL formats is objected has been disclosed.

(3) Prior Art 3 (Patent Document 3: Japanese Patent Application Laid-Open Publication No. 2002-165,153)

In order to adjust the difference between a dynamic image and the audio accompanied therewith, the technique to improve Prior Art 1, in which n analog format such as analog formats such as a high-definition, NTSC, and PAL formats is objected has been disclosed.

(4) Prior Art (Patent Document 4: Japanese Patent Application Laid-Open Publication No. 2003-158,643)

In order to adjust the difference between a dynamic image and the audio accompanied therewith, the technique which is different from either Prior Art 1 or Prior Art 2, in which n analog format such as analog formats such as a high-definition, NTSC, and PAL formats is objected has been disclosed.

DISCLOSURE OF THE INVENTION

However, in any of these method in the prior art, time domain is used and, thus, the following problems are raised to measure or correct the time difference between the digital video and the digital audio accompanied therewith. As a result, it is difficult to accurately time difference between the digital video and the digital audio accompanied therewith.

(1) Highly Accurate Measurement

The accuracy of the measurement of the time difference is limited by the time intervals among frames of a video in the prior art, and it is desired to realize the highly accurate measurement without receiving such a limitation.

(2) Statistic Process to Cross-Correlation, etc.

There possibly be statistic fluctuations in the time difference between the video and the audio accompanied therewith, and it is desired to apply a statistic treatment such as cross-correlation and cross-covariance for both timing to the time difference to highly accurately measure thereof.

(3) Identification in Frequency Domain

There is a need to highly accurately identify the most probable time difference within the frequency domain by short-time Fourier transform applied to the video and the audio accompanied therewith which are varied as time elapsed.

(4) Correspondence with Digital Data

The objective video signals is required to correspond not only to a high-definition television, NTSC and PAL formats in the prior art but also to digital data, in particular, for example, video formats corresponding to digital networks such as the Internet, video formats recorded to a computer internally arranged hard disk and record medium such as a DVD.

(5) Simplicity

A digital video is reproduced by a large fixed resolution display apparatus such as a Plasma Display Panel (PDP) and a Liquid Crystalline Display (LCD) or a monitor of a personal computer, and there is a need to realize a simplified correction based on the result of the measurement of the time difference of the digital video and the digital audio accompanied therewith.

The present invention has been achieved under such a circumstance and is to solve the above mentioned problems and provide a method for highly accurately and simply measuring the time difference between video and audio, in particular, an optimum method for measuring and/or correcting time difference between digital video signals and the digital audio signals accompanied therewith, a program, a recording medium to which the program is stored, a device for measuring or correcting a time difference between digital video signals and the digital audio signals accompanied therewith by the program and a digital video signals and digital audio signals processing apparatus including the device for measuring or correcting a time difference between digital video signals and digital audio signals.

Therefore, the present inventor has wholeheartedly studied to achieve the above object by taking into account the following points, and provides the invention configured as described in below.

(Points)

In the present invention, time difference is statistically identified with time series frequency spectrum as an object in time window frequency domain rather than time domain in the prior art.

(Configuration of Invention)

(1) Invention as Defined in claim 1

The invention defined in claim 1 relates to a method for measuring a time difference between digital video signals and digital audio signals comprises the steps of:

acquiring an interpolated frames for every time corresponding to time resolution required for the measurement thereof to provide a basic video signals;

acquiring an amplitude domain difference for each frame configuring said basic video signals;

subjecting said each frame to two-dimensional Fourier transform to provide a space frequency spectrum;

taking out a low-pass component of said space frequency spectrum from said frequency spectrum;

passing the digital audio signals accompanied with the digital video signals through a low-pass filter for eliminating a high frequency component by signal processing;

acquiring a frequency spectrum by short-time window one-dimensional Fourier transform so as to provide samples for every time corresponding to time resolution required for said measurement;

taking said low-pass frequency spectrum from said frequency spectrum, wherein said low-pass component is considered to be a time series frequency of said basic audio signals;

calculating a cross-correlation factor for the time series frequency of said basic video signals and the time series frequency of said audio signals;

acquiring the maximum value of said cross-correlation factor; and statistically identifying said time difference between said digital video signals and said digital audio with the number of time series samples providing said maximum value, thereby measuring said time difference.

(2) Invention as Defined in claim 2

The invention as defined in claim 2 relates to the method for measuring a time difference between said digital video signals and said digital audio signals as set forth in claim 1, wherein the video frames in said digital video signals are increased such that the sampling intervals are equal to the measuring time resolution by the video frames interpolation, and the information obtained from the short-time two-dimensional Fourier transformed frequency spectrum is provided as time series signals of the frequency domain.

(3) Invention as Defined in claim 3

The invention as defined in claim 3 relates to the method for measuring a time difference between said digital video signals and said digital audio signals as set forth in any one of claim 1 or claim 2, wherein said digital audio signals are subjected to a digital filter to eliminate the high frequency component in claim 1, and the lower frequency domain digital audio signals are subjected to the short-time one-dimensional Fourier transform for every time window that is the same as the measuring time resolution in claim 2, thereby providing audio signal time series of frequency domain in which a sampling interval is longer than that of the present digital audio signals to provide an information of said basic audio signals.

(4) Invention as Defined in claim 4

The invention as defined in claim 4 relates to the method for measuring a time difference between said digital video signals and said digital audio signals as set forth in any one of claims 1 to 3, wherein said basic video signals 3 claim 2 is subjected to two-dimensional Fourier transform within every frames to calculate the average value among the frames for every space frequency component to prepare the video time series data in the frequency domain and said basic audio signals of claim 3 is calculated to provide the average value in the time window for every frequency component to generate the video time series data in the frequency domain to provide two information for every time window that is same as the measuring time resolution in the method of claim 1.

(5) Invention as Defined in claim 5

The Invention as defined in claim 5 relates to the method for measuring a time difference between said digital video signals and said digital audio signals as set forth in any one of claims 1 to 4, wherein said basic audio signals of claim 3 is subjected to short time window Fourier transform being same as the measure requiring time resolution to extract the audio time series data in the frequency domain.

(6) Invention as Defined in claim 6

The invention as defined in claim 6 measured a time difference between the digital video signals and the digital audio signals of any one of claims 1 to 5, wherein further comprises steps of calculating a cross correlation factor of said video time series data and said audio time series data; and detecting the peak of said cross-correlation factor to acquire a data position corresponding to said peak.

(7) Invention as Defined in claim 7

The invention as defined in claim 7 relates to the method for measuring a time difference between said digital video signals and said digital audio signals as set forth in any of claims 1 to 6, wherein the sample point of the peak of said cross-correlation factor that is detected as in above is identified with the time difference between the digital video signals and the digital audio signals from time corresponding to the sampling intervals.

(8) Invention as Defined in claim 8

The invention as defined in claim 8 relates to a method for correcting a time difference between the digital video signals and the digital audio signals by subjecting the digital audio to sample shift for the number of samples corresponding to the time difference between the digital video signals and the digital audio signals which are identified in above to delay the digital audio to correct thereof.

(9) Invention as Defined in claim 9

The invention as defined in claim 9 is a program including the method according to any one of claims 1 to 8.

(10) Invention as Defined in claim 10

The invention as defined in claim 10 is a recording medium in which the program according to claim 9 is stored.

(11) Invention as Defined in claim 11

The invention as defined in claim 11 is a device for measuring or correcting a time difference between the digital video signals and the digital audio signals by the program according to any one of claim 9 or claim 10.

(12) Invention as Defined in claim 12

The invention as defined in claim 12 is a digital video signals and digital audio signals processing apparatus including said device for measuring or correcting a time difference between the digital video signals and the digital audio signals in above.

(13) Invention as Defined in claim 13.

The invention as defined in claim 13 is the digital video signals and digital audio signals processing apparatus according to claim 13, wherein the digital video signals and the digital audio signals are inputted through a network in said digital video signals and digital audio signals processing apparatus.

EFFECT OF THE INVENTION

The invention as configured in above can solve the problems mentioned in above.

(1) Highly Accurate Measurement

The accuracy of the measurement of the time difference is limited by the time intervals among frames of a video, and the present invention realizes a video frame time interval by frame interpolation so as to corresponding to the required time resolution in order to realize the highly accurate measurement without receiving such a limitation, thereby solving Problem (1) in above.

(2) Statistic Treatment of Cross-Correlation, etc.

The configuration of the present invention provides the statistic processing the cross-correlation and so on of the time series data obtained by the basic video signals and the basic audio signals, thereby solving Problem (2) in above.

(3) Identification in Frequency Domain

The configuration of the present invention allows the identification within the frequency domain, thereby solving Problem (3) in above.

(4) Correspondence to Digital Data

The configuration of the present invention allows the correspondence to digital data, thereby solving Problem (4) in above.

(5) Simplicity

The configuration of the present invention, in particular the invention as defined in claim 10, provides a hard ware of main part of said program to be installed into a digital definition television receiver, a home theater device, or a personal computer, thereby solving Program (5) in above.

BEST MODE FOR CARRYING OUT THE INVENTION

The embodiment of the present invention (hereinafter, so called simply as the invention) will now be explained with reference to the drawing in below.

EXAMPLE 1

Examples of the invention are disclosed. The terminology used herein is explained. These examples are not intended to limit the scope of the invention.

Digital video is the signals in which the digital video signals and the digital audio signals accompanied therewith are integrated. The digital video signals are of the time series of the digital frames. The digital frames are a data of pixels of a color image by analog to digital (A/D) conversion. It is abbreviated by "frame(s)". The digital audio signals are of the time series of the data of the audio signals by analog to digital conversion.

Next, the method for highly accurately and simply measuring the time difference between video and audio and the measurement apparatus according to the invention will be explained in below.

(1) Digital Video Signals and Digital Audio Signals Accompanied Therewith

For example, the digital video data and the digital audio data are separately read out, respectively, of a digital video in which the digital video signals and the digital audio signals accompanied therewith are integrated or of a medium (for example, AVI format, DVD format, CD format and the like) which is previously recorded as a computer readable format file. In Example 1, a bust shot of an announcer who reads news is assumed. The measurement process by processing digital video signals and the digital audio signals accompanied therewith and identifying a time difference therebetween is followed FIG. 1 that illustrates the whole figure of the method in accordance with the present invention.

(2) Pretreatment of Video Data

The pretreatment of the video data comprises the steps of (V1) reading video frames; (V2) extracting a mouth part of the announcer; (V3) monochrome image converting the mouth part; (V4) enhancing of the image; (V5) two-dimensional fast Fourier transforming; (V6) statistically processing within the frames of Fourier series; (V7) interpolating spectrum time series; and (V8) extracting frequency domain time series data. The process of the pretreatment of the video data is shown in FIG. 2.

Further, the reading process of the video frames in accordance with the present invention will be explained step by step with reference to FIGS. 3 to 7 in below.

(V1) Input Video Data

In reading the video frames, only frames which are to be an object for measuring or correcting a time difference between the digital video signals and the digital audio signals are read out.

(V2) Extract of the Mouth Part of the Announcer

The extraction of the mouth part of the announcer is realized by image extracting the designated part based on the conventional technique.

(V3) Monochrome Image Conversion of the Mouth Part

The extracted mouth part in above is monochrome image converted to realize as shown in FIG. 3 by linear combining three-dimensional color data (Red, Green, Blue) every pixel.

(V4) Contrast Enhancement within Frames

The image enhancement is carried out by enhancing the contrast thereof as shown FIG. 4.

(V5) Two-Dimensional Fourier Transform within Frames

The two-dimensional fast Fourier transform is realized by repeating one-dimensional fast Fourier transform twice to the mouth image data after the enhancement treatment in (V4) in above. The example is shown in FIG. 5.

(V6) Statistic Process within Frames of Fourier series

The frequency domain frame data is subjected to statistic process within frames (For example, calculation of standard deviation) to extract feature quantity of each frame.

(V7) Interpolation to Spectrum Time Series

The interpolation process by interpolating the time variation of the Fourier series is realized by interpolating so as to acquire the sample corresponding to the set time resolution (2 ms in the Example) with a sample of every frame time of the average low-pass of the space frequency component as an original data. The number of time series data after the interpolation is represented by NV+1. The Example thereof is shown in FIG. 6. The point represents the data prior to the interpolation.

(V8) Extraction of Frequency Domain Time Series Data

The approximate differential coefficient absolute value is acquired by calculating the absolute value of the difference between adjacent data. The number of time series data is represented by NV. This is the time series data of the frequency domain feature quantity of the video data. The example thereof is shown in FIG. 7.

Next, the pretreatment of the audio data in accordance with the present invention will be explained step by step with reference to FIGS. 8 to 11 in below.

(3) Pretreatment of Audio Data

The pretreatment of the audio data comprises the steps of: (A1) reading audio samples; short-time window one-dimensional fast Fourier transforming the audio samples; (A3) correcting the time difference corresponding to time window of Fourier series; calculating the approximate differential coefficient by the time difference; and (A5) providing time series data of the frequency domain feature quantity of the audio data by calculating a square average. The process of the pretreatment of the audio data is shown in FIG. 8.

(A1) Input of Audio Data

In the reading step of the audio sample, the digital audio data samples accompanied with the pretreatment of the video data in the step of (2) (V1) is read out. The example thereof is shown in FIG. 9. Typically, the data is converted from stereo to monaural.

(A2) Short-time window Fourier Transform

The short-time window one-dimensional fast Fourier transform of the audio samples is realized such that the short-time window is adjusted so as to be equal to the time resolution set in the step of (2) (V7) interpolation of time variation of the Fourier series and subjected to Fourier transform as sequentially moved the time window, as shown in FIG. 10.

Alternatively, the high frequency component may be eliminated from the digital audio signals by a digital filter and the lower frequency domain digital audio signals may be subjected to the short-time one-dimensional Fourier transform for every time window equal to the measuring time resolution as defined in claim 2 to provide the audio signals time series of the frequency domain in which the sampling intervals are longer than those of said digital audio signals, thereby providing said audio signals time series as a time series data of the frequency domain of the basic audio signals.

(A3) Correction of Time Window Difference

The correction of the time difference corresponding to time window of Fourier series is realized by shifting the considerable quantity of data in the direction of time, in which the correction is for the time difference of the time window by ½ thereof. The number of time series of the basic frequency is represented by NA+1.

(A4) Approximate Differential Coefficient Process by the Difference

The calculation of the approximate differential coefficient by the time difference is applied to the difference between the adjacent data.

(A5) Extraction of Frequency Domain Time Series Data

The calculation of a square average is realized by calculating the root of the square of the difference. The number of time series data is represented by NA. This is the time series data of the frequency domain feature quantity of the audio data; NA=NV. The example thereof is shown in FIG. 11.

Alternatively, the basic video signals may be subjected to the two-dimensional Fourier transform within the frames to calculate the average value in the frames for every space frequency component to generate video time series data in the frequency domain as well as for the basic audio signals, the average value in the time window for every frequency component is calculated to generate the audio time series data in the frequency domain, whereby two information for every time window equal to the measuring time resolution can be generated.

The identification process of the time difference between the digital video signals and the digital audio signals which have been subjected to the pretreatment in above in accordance with the present invention will now be explained with reference to FIGS. 12 and 13 in below.

(4) Identification Process

The identification of the time difference is applied to the time series data of the frequency domain feature quantity of the video data in the step of (2) (V8) in above and the time series data of the frequency domain feature quantity of the audio data in the step of (3) (A5) in above the process shown in FIG. 12. The cross-correlation function between the time series data of the frequency domain feature quantity of the video data and the time series data of the frequency domain feature quantity of the audio data, having same lengths of NA=NV, is calculated. The explanation thereof is provided in below.

Firstly, the cross-correlation coefficient between the audio time series data and the audio time series data in above to detect the peak of the cross-correlation function to acquire the data position corresponding to the peak. Secondary, the sample point that is the detected cross-correlation coefficient is the peak is identified with the time difference between the digital video signals and the digital audio signals from the time corresponding to one of sampling intervals. The calculation of the cross-correlation coefficient is carried out such that, for example, the calculation of the cross-correlation series $R_{xy}(m)$ of two random series $x_n, y_n$ is applied to the following numerical formula (1):

$$R_{xy}(m) = E\{x_{n+m} y_n^*\} = E\{x_n y_{n-m}^*\} \quad (1)$$

wherein, * represents a complex conjugate; $E\{\cdot\}$ represents an expected value; $x_n$ and $y_n$ each represents a simultaneously raised static random series wherein, n is assumed to be $-\infty < n < +\infty$. However, the cross-correlation coefficient is actually calculated by using a certain time sampling (the number of samplings, N>1) in the following Numerical Formula (2):

$$\hat{R}_{xy}(m) = \sum_{n=0}^{N-m-1} x_{n+m} y_n^* \quad m \geq 0 \quad (2)$$

$$\hat{R}_{xy}(m) = \hat{R}_{yx}^*(-m) \quad m < 0$$

(Result of the Measurement and Correction)

The result of the measurement by the example is shown in FIG. 13. The time corresponding to the sample data migration quantity of the maximum cross-correlation coefficient is identified with the time difference between the digital video signals and the digital audio signals to measure the time difference. When the cross-correlation coefficient was 0.6681 (the maximum value), it has been determined that the video data is delayed—0.0227 seconds against the audio data, thereby proving that the difference can be highly accurately measured. Accordingly, the time difference between the digital video signals and the digital audio signals can be corrected by delaying the audio signal sample by this differential time. That is to say, in the samples corresponding to the time difference between the digital video signals and the digital audio signals identified in the step of (4) in above, the sample shift is applied to the digital audio to delay the digital audio to correct, whereby the time difference between the digital video signals and the digital audio signals is corrected.

The apparatus for realizing the method for measuring and correcting the time difference between the digital video signals and the digital audio signals accompanied therewith in above in accordance with the present invention will be explained in below.

(5) Hardware

Since all signals are previously converted into digital signals by an analog to digital conversion circuit to record, it can be realized with a high performance and high-speed microprocessor. For the fast Fourier transform including a lot of data to be process, a special-purpose processor such as a digital signal processor (DSP) may be used together therewith. Accordingly, since the apparatus can be miniaturized by simple configuration, the present apparatus can be implemented not only at a broadcast station but also at a scene in which the data is to be collected, a relay station or in a receiver.

(6) Effect (Result of the Processing)

The effect of the method and the apparatus as configured in accordance with the present invention in above will be further explained in below.

(Measurement Accuracy)

For the accuracy of the measurement, the TV news broadcasted by the public broadcast station (Japan Broadcasting Corporation: NHK) is recorded as a digital video (non-compression AVI format) to perform the present invention. In order to confirm the effect of the accuracy of the measurement, the audio data was separated and the time difference between the audio data into which the time difference is intentionally incorporated and the video data was identified in accordance with the present method. As a result, high accurate measurement of the time difference was realized. In the method or apparatus in the prior art, there is a limitation of the video frame time intervals, while, in the present method, it is the statistic identification of the cross-correlation of the time series data in the frequency domain, therefore, the method is not undergone this limitation.

(Statistic Process of Cross-Correlation)

For the effect of the statistic process of, for example, the cross-correlation and the like, Fundamental statistic was applied to the feature extractions of the video signals and the audio signals and the statistical cross-correlation quantity between the extracted time series data of the video signals and the time series data of the audio signals was calculated, whereby it was confirmed that the effect of the data sample quantity corresponding to the time difference between time series data could be identified.

(Identification in Frequency Domain)

In the identification in the frequency domain, the digital video signals and the digital audio signals in the time domain were subjected to the short-time window fast Fourier transform, whereby the variations of the video and the audio accompanied therewith as time elapsed could be captured as the variation of related frequency as time elapsed and the effect thereof was confirmed.

(Correspondence to Digital Data)

For the correspondence to digital data, though the object is a digital video in the example of the invention, an analog video can easily converted into a digital video by the analog to digital conversion of the conventional technique as shown in (Effect 1), therefore, it has been confirmed that the effect of the invention is not deteriorated by the analog video as an object.

(Simplicity)

For the simplicity, the software of the present invention was stored to a recording medium such as a magnetic recording medium, an optical recording medium, a magneto-optical recording medium and a memory and the medium is mounted to a general personal computer, thereby dimply implementing the invention. Thus, the effect of the invention could be confirmed. Since the calculation by the personal computer is for a product or a sum as a main product thereby, the software can be replaced with a conventional hard ware such as a DSP, thereby providing the miniaturized and higher speed system.

(Conclusion)

According to the mentioned in above, it has been clarified that the present invention solves the above problems 1, 2, 3, 4 and 5 and provides the measurement of a time difference between video and audio, in particularly, highly accurate measurement of a time difference between digital video and the digital audio accompanied therewith, which could not be achieved in the prior art.

EXAMPLE 2

Furthermore, another embodiment used in the present invention will be shown in below.

Example 2 was carried out by the same configuration of Example 1 except that a compressed digital audio/video (for example, Real Video & Audio or Windows (trademark) Media) that has been widely used in the Internet is converted into an AVI file format for its network packets. Whereby, the similar effect of the present invention can be obtained for digital video signals and the digital audio signals accompanied therewith of an actual time recorded in a medium, except for a file of a computer readable format that is previously recorded to the medium.

EXAMPLE 3

In addition to the above, yet another embodiment used in the present invention will be shown in below.

In the apparatus for reproducing digital video signals and the digital audio signals accompanied therewith (such as a digital cinema system, a home theater system, a personal computer and a game instrument), the time required for the process to reproduce the digital video signals is always longer than the time required for the process to reproduce the digital audio signals, without any exception. Therefore, even though the digital audio signals are delayed, the delay time can be adjusted based on the result of the measurement, whereby the digital video signals can be highly accurately synchronized with the digital audio signals. This embodiment comprises the same configuration of Embodiment 1 except for this mechanism incorporated into the apparatus for reproducing. Whereby, the effect to realize the proper synchronization can be provided not only for digital video signals with the digital audio signals accompanied therewith as an object to be reproduced but also for the whole system.

(Additional Note for Other Examples)

It should be understood that the present invention is not intended to limit to the above embodiments and any modification or variation can be applied to the invention within the scope of the present invention. Since the present invention provides extremely accurate and simple configuration implemented, it is possible to provide a system for correcting a time difference between a dynamic image and the audio, recording or reproducing thereof by combining with a signal processor to be installed not only in a broadcasting station but also in a relay station as a facility.

Alternatively, the present invention can be mounted on a digital video camera. Otherwise, the present invention can be applied to a high minute plasma display apparatus. The present invention can also be applied to a digital cinema system, a home theater system using the Internet, a personal computer having a television function by the projector including the apparatus for real time measuring or correcting a time difference between digital video signals and digital audio signals in accordance with the present invention.

INDUSTRIAL APPLICABILITY

As described in above, the present invention provides a method for highly accurately and simply measuring a time difference between video and audio and a device for measuring thereof. In spite of the simple configuration, the device for extremely accurately measuring or correcting the time difference between digital video signals and digital audio signals can be realized and, thus, the system for measuring or correcting a time difference between digital video signals and digital audio signals on real time, and recording, communicating, and reproducing thereof can be implemented, which is extremely useful.

Figure 1:
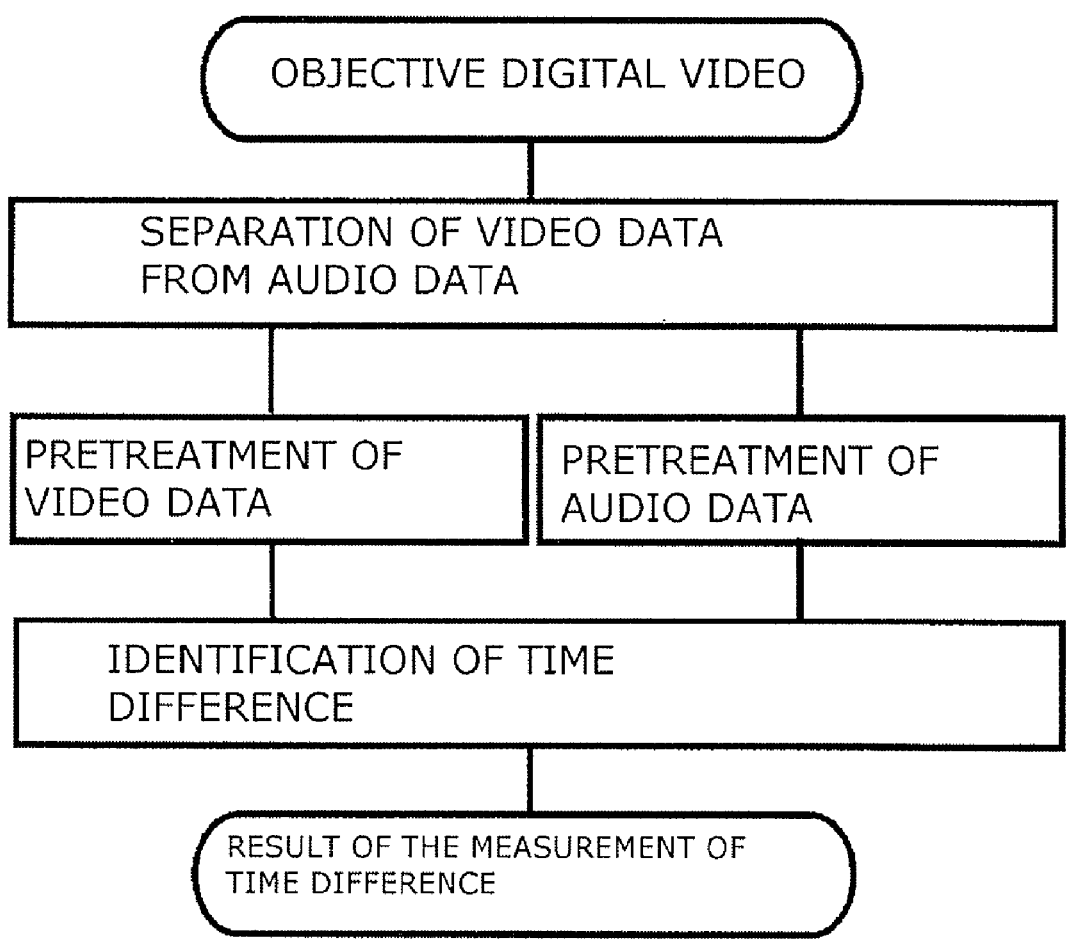
FIG. 1 is a view showing an entire configuration of the method in accordance with the present invention.
Figure 2:
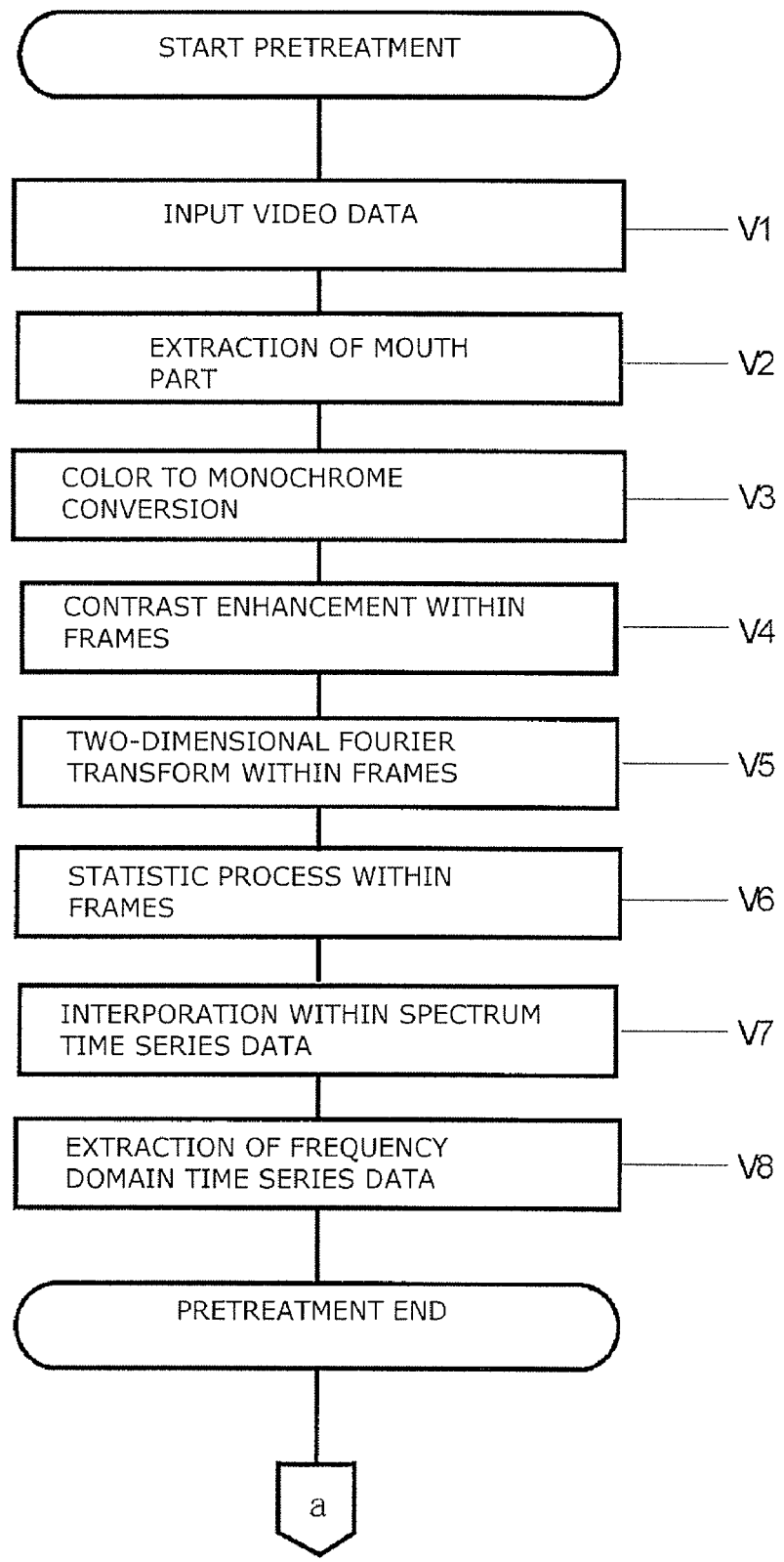
FIG. 2 is a flow chart of the pretreatment process for a video data in accordance with the present invention.
Figure 3:
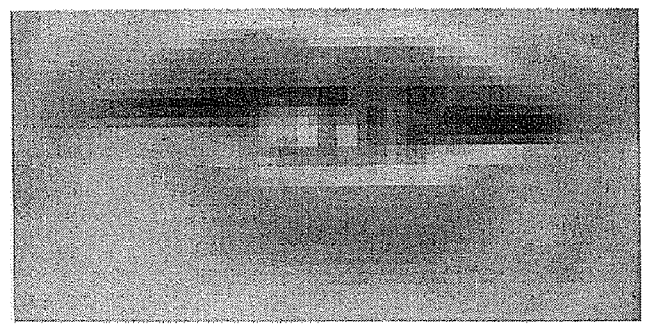
FIG. 3 is a view illustrating an example of the extracted image (monochrome image) of a mouth part.
Figure 4:
FIG. 4 is a view illustrating an example of the contrast enhancement of the mouth part.
Figure 5:
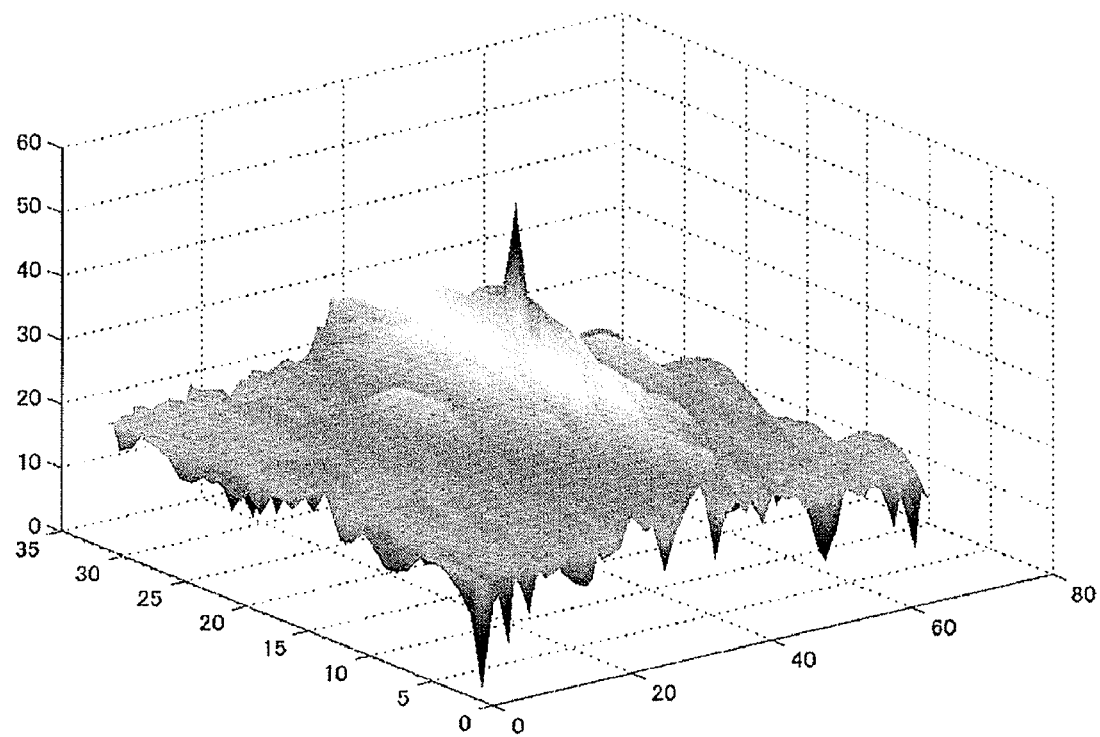
FIG. 5 is a view illustrating an example of two-dimensional Fourier transform of the mouth image.
Figure 6:
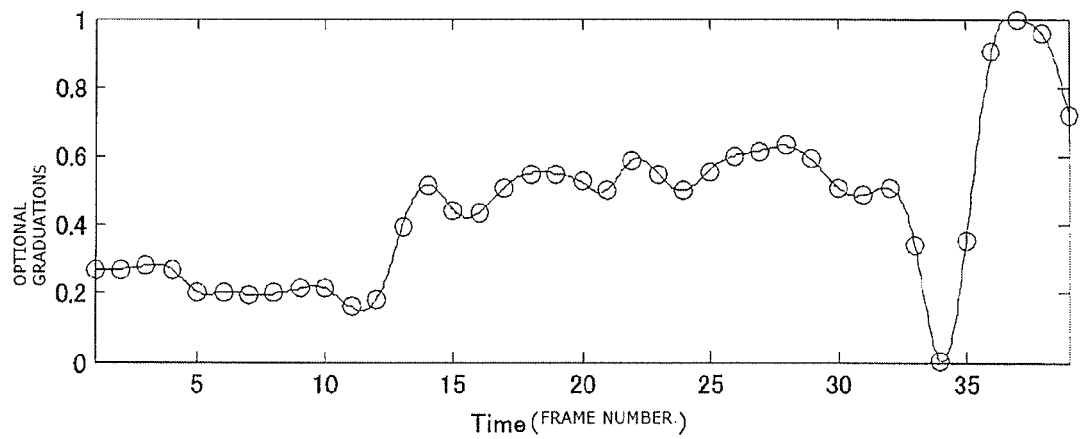
FIG. 6 is a view illustrating changes in low-pass average of the space frequency component as time elapsed.
Figure 7:
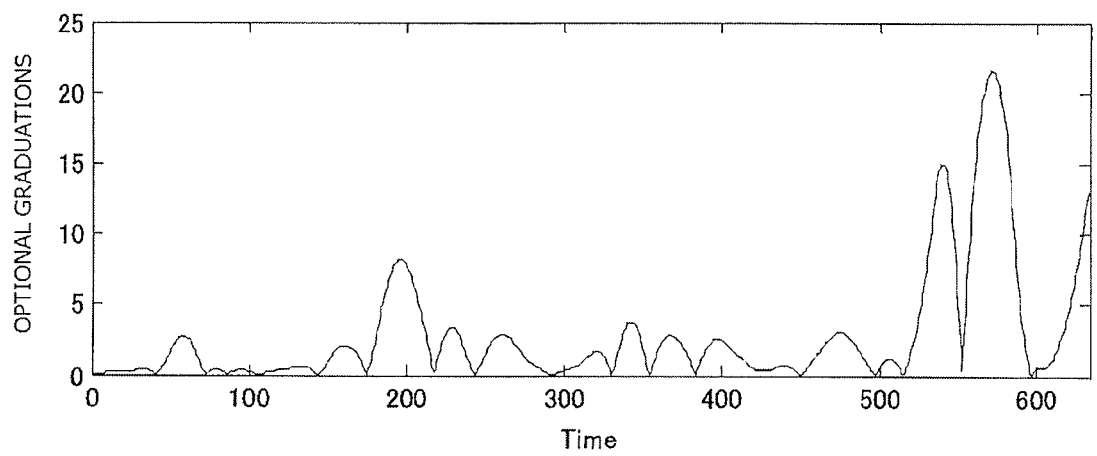
FIG. 7 is a view illustrating an example of time series data of the frequency domain feature quantity of the video data.
Figure 8:
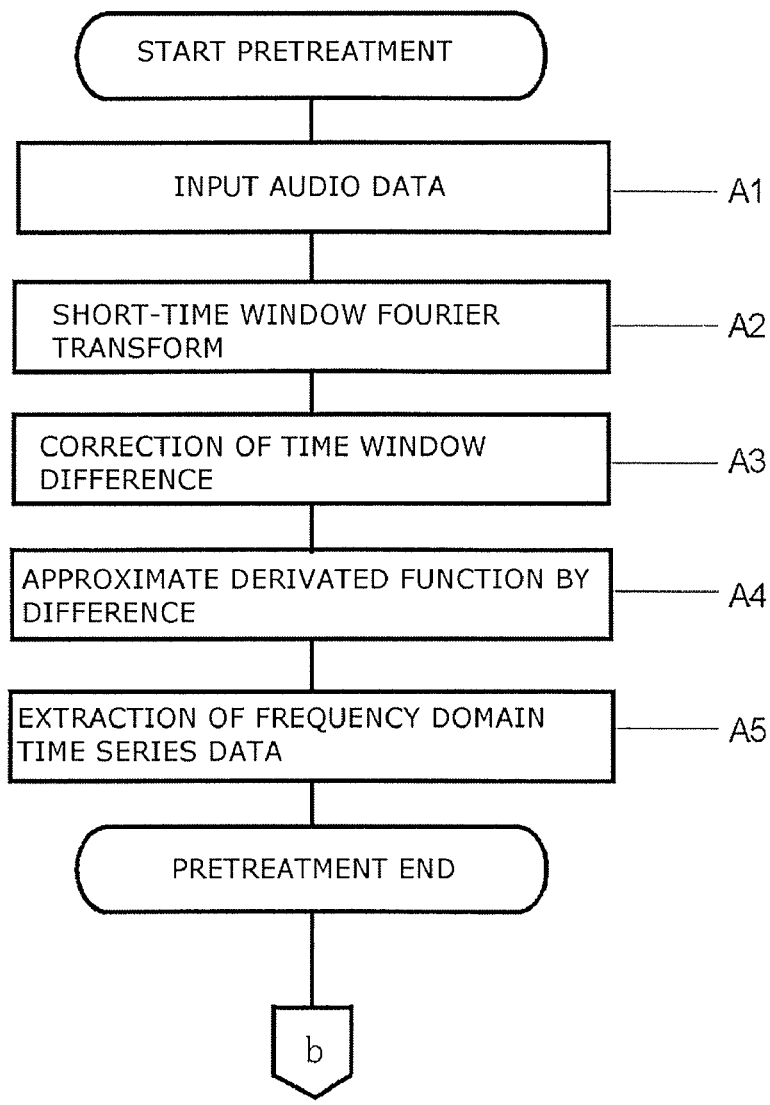
FIG. 8 is a flow chart of the pretreatment process for the audio data in accordance with the present invention.
Figure 9:
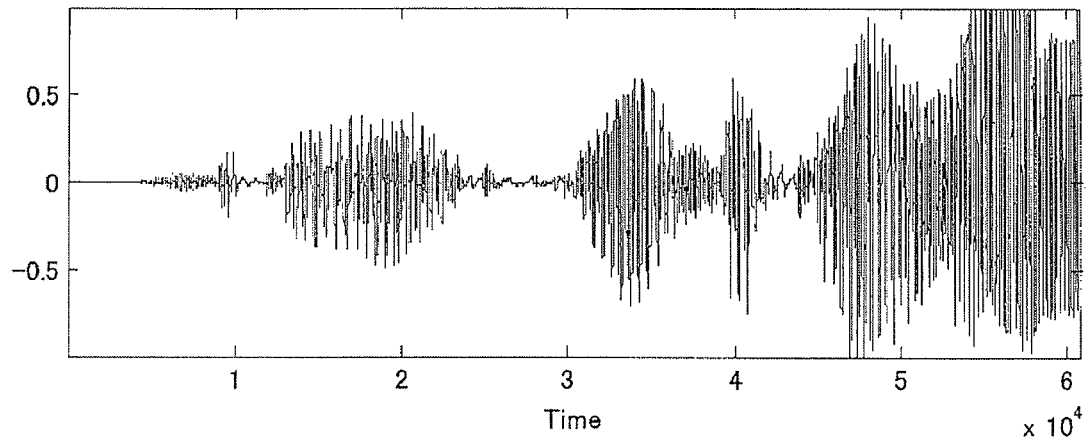
FIG. 9 is a view illustrating an example of changes of the audio data sample as time elapsed.
Figure 10:
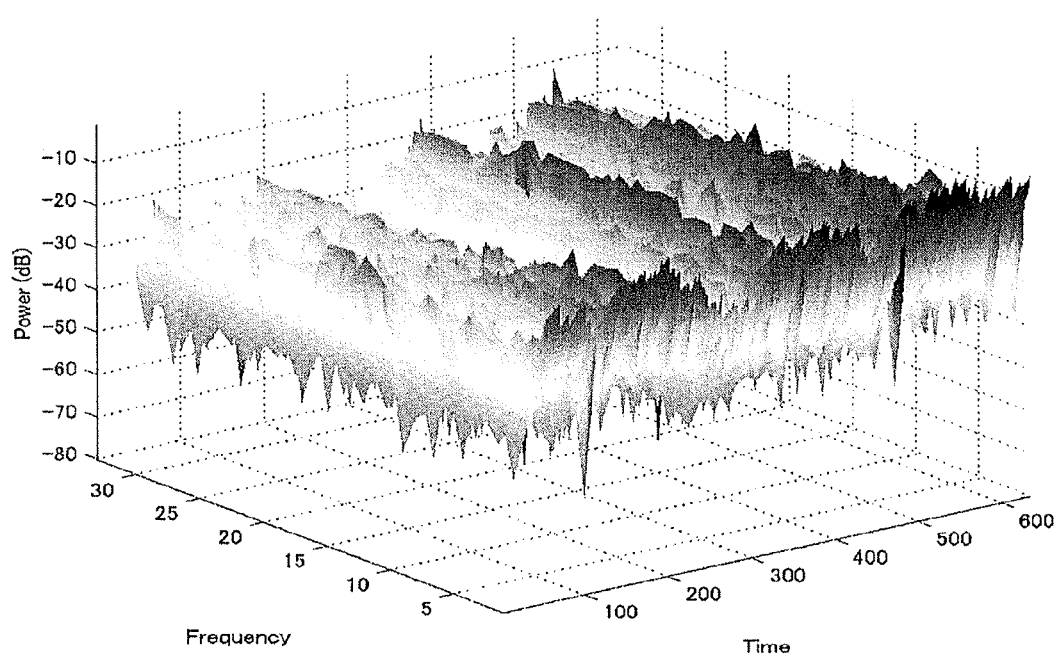
FIG. 10 is a view illustrating an example of changes of the short-time window one-dimensional Fourier series of the audio sample as time elapsed.
Figure 11:
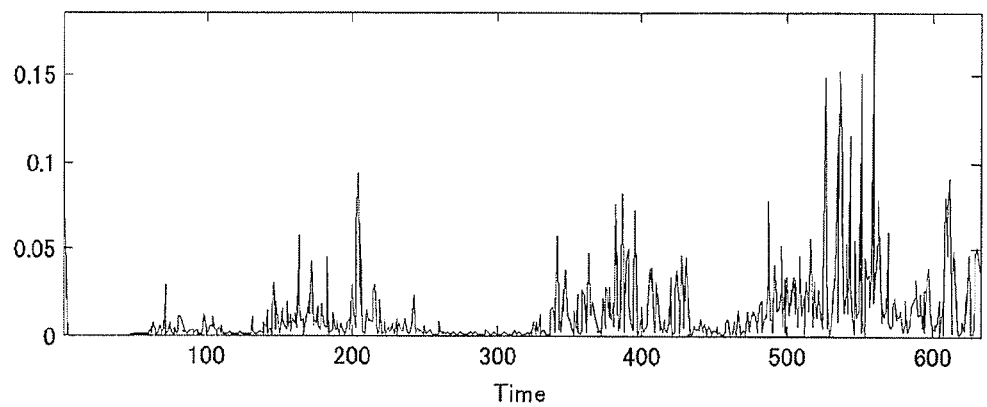
FIG. 11 is a view illustrating an example of the time-elapsed data of the frequency domain feature quantity of the audio data.
Figure 12:
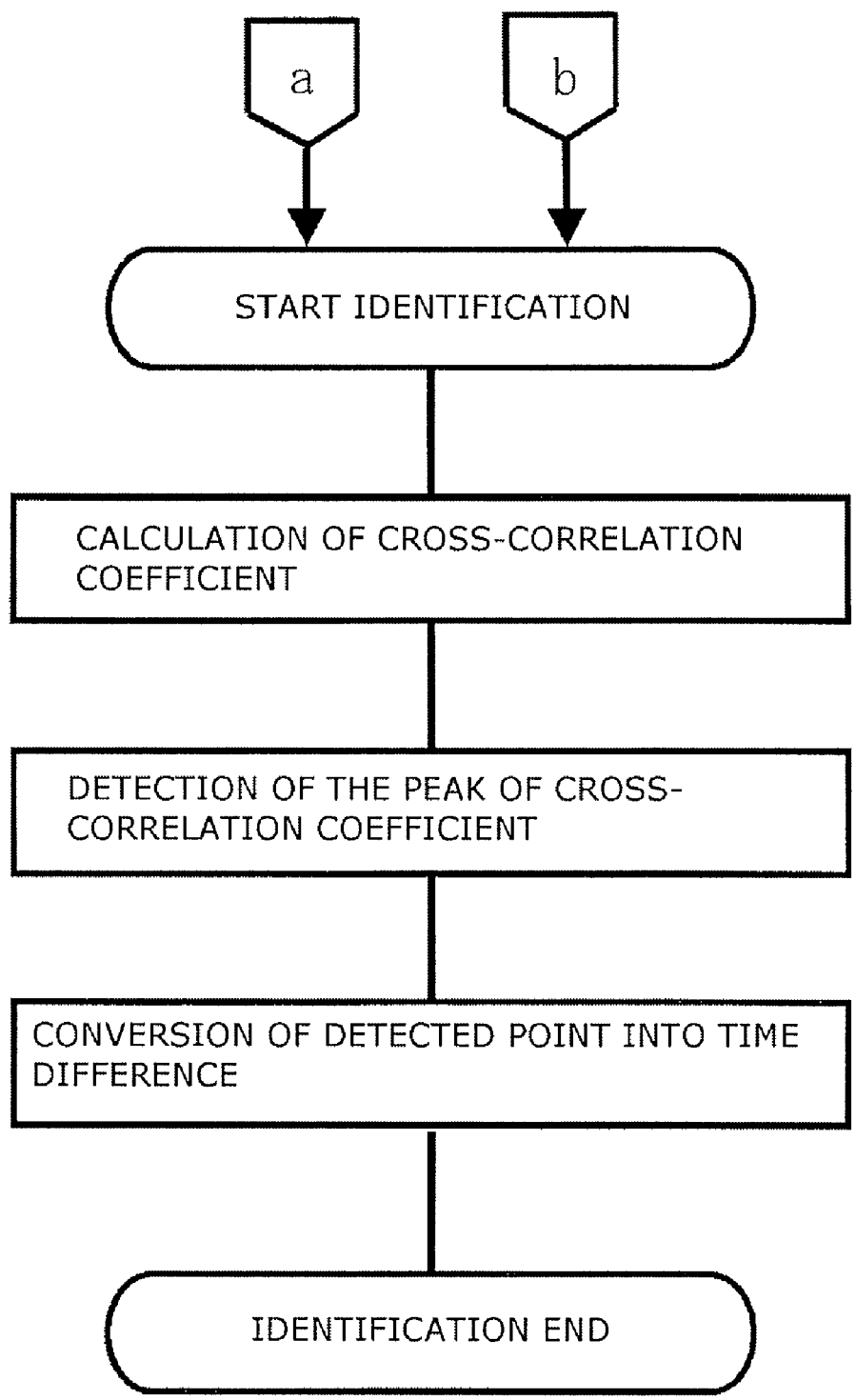
FIG. 12 is a view illustrating the identification process for the time difference in accordance with the present invention.
Figure 13:
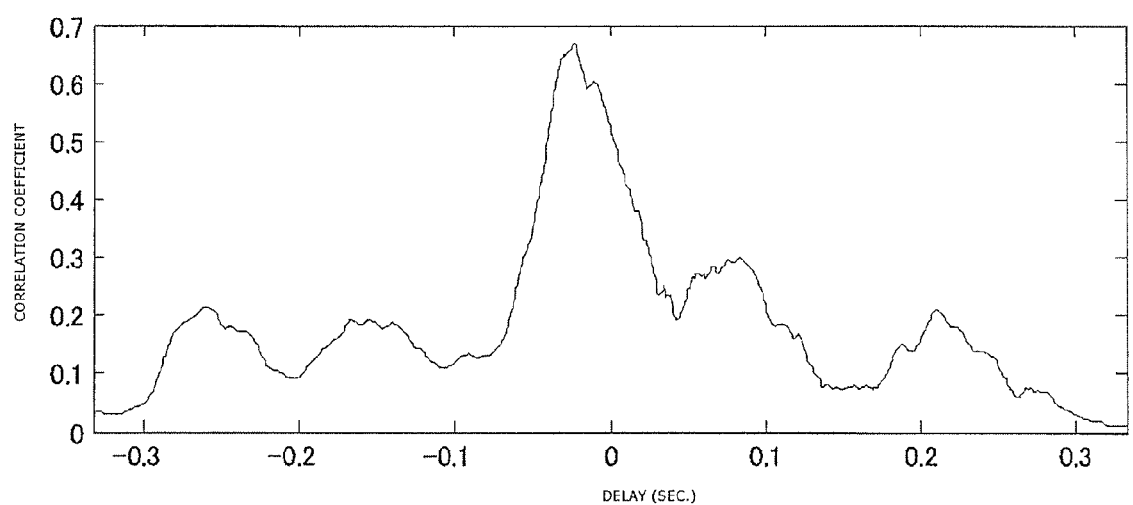
FIG. 13 is a view illustrating an example of the cross-correlation coefficient between the time elapsed data of the frequency domain feature quantity of the video data and the time elapsed data of the frequency domain feature quantity of the audio data.

What is claimed is:

1. A method for measuring a time difference between digital signals and digital audio signals comprises the steps of:
    reading a video frame;
    extracting an image of the designated part in said video frame;
    acquiring an interpolated frame for each time corresponding to a time resolution needed for the measurement by inter-frame interpolation;
    wherein, frames configuring said digital video signals being subjected to a process including the steps of:
        acquiring amplitude domain difference for each frame configuring the basic video signals;
        acquiring a space frequency spectrum by two-dimensional Fourier transform of each differential frame;
        taking out a low-pass component of said space frequency spectrum, thereby considering said low-pass component to be a time series frequency of said basic video signals;
    wherein, said digital audio signals accompanied with said digital video signals being subjected to a process including the steps of:
        removing a high frequency component by passing through a low-pass filter;
        acquiring a frequency spectrum by short-time window one-dimensional Fourier transform so as to provide samples at every time corresponding to a time resolution needed for the measurement;
        taking out a low-pass frequency spectrum from said frequency spectrum, thereby considering said low-pass component to be a time series frequency of said basic audio signals;
    calculating a cross-correlation coefficient for said time series frequency of said basic video signals and said time series frequency of said basic audio signals to provide the maximum value of said cross-correlation coefficient for a time series data of the frequency domain of said basic video signals and a time series data of the frequency domain of said basic audio signals;
    statistically identifying the time difference between said digital video signals and said digital audio signals from the number of time series samples providing said maximum value.

2. The method for measuring a time difference between digital video signals and digital audio signals as set forth in claim 1, wherein further comprises the steps of:
    said video frames in said digital video signals are increased such that sampling intervals are equal to measuring time resolution by interpolating between said video frames; and
    providing information obtained from said short-time two-dimensional Fourier transformed frequency spectrum as a time series data of the frequency domain of said basic video signals.

3. The method for a time difference between said digital video signals and said digital audio signals as set forth in claim 2, wherein said digital audio signals are subjected to a digital filter to remove the high frequency component, and the lower frequency domain digital audio signals are subjected to the short-time one-dimensional Fourier transform at every time window, thereby providing audio signal time series of frequency domain in which a sampling interval is longer than that of said digital audio signals to consider said audio signals time series to be said time series data of the frequency domain of said basic audio signals.

4. The method for measuring a time difference between said digital video signals and said digital audio signals as set forth in claim 2, wherein said method for measuring a time difference between digital video signals and digital audio signals further comprises the steps of:
    calculating the average value among the frames for every space frequency component by subjecting said basic video signals to generate the video time series data in the frequency domain; and
    calculating the average value among the time windows for every frequency component by processing said basic audio signals to generate the audio time series data in the frequency domain, thereby providing two information for every time window that is the same as the measuring time resolution.

5. The method for measuring a time difference between digital video signals and digital audio signals as set forth in claim 3, wherein said basic audio signals is subjected to short-time window Fourier transform being equal to measuring requirement time resolution to extract a audio time series data in a frequency domain.

6. The method for measuring a time difference between digital video signals and digital audio signals as set forth in claim 1, wherein said method further comprises the step of:

calculating a cross-correlation coefficient of said video time series data and said audio time series data and detecting a peak of said cross-correlation coefficient to provide a data position corresponding to said peak.

7. The method for measuring a time difference between digital video signals and digital audio signals as set forth in claim 6, wherein said peak of said cross-correlation coefficient is considered to be a sample point, wherein the time that corresponds to each said sampling interval, that is, between said sample points, is identified with said time difference between said digital video signals and said digital audio signals.

8. A method for correcting a time difference between digital video signals and digital audio signals as set forth in claim 7, wherein said method further comprises the step of subjecting the number of samples corresponding to the time difference between said digital video signals and said digital audio signals to sample shift for said digital audio to delay said digital audio, thereby correcting the time difference between said digital video signals and said digital audio signals.

* * * * *